(12) United States Patent
Nelson et al.

(10) Patent No.: US 7,389,408 B1
(45) Date of Patent: Jun. 17, 2008

(54) MICROARCHITECTURE FOR COMPACT STORAGE OF EMBEDDED CONSTANTS

(75) Inventors: Christopher P. Nelson, Santa Clara, CA (US); John Gregory Favor, Scotts Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 45 days.

(21) Appl. No.: 11/566,206

(22) Filed: Dec. 1, 2006

Related U.S. Application Data

(60) Provisional application No. 60/866,205, filed on Nov. 16, 2006, provisional application No. 60/866,203, filed on Nov. 16, 2006, provisional application No. 60/832,848, filed on Jul. 23, 2006, provisional application No. 60/832,822, filed on Jul. 23, 2006, provisional application No. 60/741,724, filed on Dec. 2, 2005.

(51) Int. Cl.
*G06F 7/76* (2006.01)
(52) U.S. Cl. ............................................... 712/300
(58) Field of Classification Search ................. 712/300
See application file for complete search history.

(56) References Cited

U.S. PATENT DOCUMENTS

| | | | |
|---|---|---|---|
| 6,275,927 B2 * | 8/2001 | Roberts | 712/213 |
| 6,338,132 B1 * | 1/2002 | Kyker et al. | 712/211 |
| 6,732,256 B2 * | 5/2004 | Henkel et al. | 712/208 |
| 6,732,257 B1 * | 5/2004 | Sheaffer | 712/210 |
| 6,883,087 B1 * | 4/2005 | Raynaud-Richard et al. | 712/213 |
| 6,986,029 B2 * | 1/2006 | Yamada et al. | 712/300 |
| 7,010,665 B1 * | 3/2006 | Toll et al. | 711/220 |
| 7,150,005 B2 * | 12/2006 | Harscoet | 717/120 |

* cited by examiner

*Primary Examiner*—William M Treat
(74) *Attorney, Agent, or Firm*—PatentVentures; Bennett Smith; Korbin Van Dyke

(57) ABSTRACT

An instruction stream having variable length instructions with embedded constants (e.g. immediate values and displacements) is translated into a stream of operations and a corresponding stream of bit fields, enabling advantageous compact storage of the embedded constants. The operations and the compact constants are optionally stored in entries in a trace cache and/or processed by execution pipelines. The compact constants are optionally formulated as a small constant field, a pointer, or both. The pointer of a particular one of the operations optionally references one of the bit fields within a window of the operations associated with the particular operation. A full-sized constant is constructed from one or more contiguous ones of the bit fields, starting with the referenced bit field, by unpacking and uncompressing information from the contiguous bit fields. An operation optionally includes a plurality of small constant fields and pointers to specify a respective plurality of constants.

27 Claims, 7 Drawing Sheets

MICROARCHITECTURE FOR COMPACT STORAGE OF EMBEDDED CONSTANTS

CROSS REFERENCE TO RELATED APPLICATIONS

Priority benefit claims for this application are made in the accompanying Application Data Sheet (if any). To the extent permitted by the type of the instant application, this application incorporates by reference for all purposes the following application(s), which are all owned by the owner of the instant application:

U.S. Provisional Application Ser. No. 60/741,724, filed Dec. 2, 2005, first named inventor Christopher P. Nelson, and entitled A MICROARCHITECTURE FOR COMPRESSED STORAGE OF OPERATIONS WITH EMBEDDED CONSTANTS;

U.S. Provisional Application Ser. No. 60/832,848, filed Jul. 23, 2006, and entitled MICROPROCESSOR WITH CACHES FOR INSTRUCTIONS, BASIC BLOCKS, AND TRACES;

U.S. Provisional Application Ser. No. 60/832,822, filed Jul. 23, 2006, and entitled MICROPROCESSOR WITH COHERENT CACHES FOR BASIC BLOCKS AND TRACES;

U.S. Provisional Application Ser. No. 60/866,205, filed Nov. 16, 2006, first named inventor John Gregory Favor, and entitled PROCESSOR WITH OPTIMIZED OPERATION SEQUENCES FOR BASIC BLOCK AND MULTI-BLOCK TRACE CACHES; and U.S. Provisional Application Ser. No. 60/866,203, filed Nov. 16, 2006, first named inventor Matt Ashcraft, and entitled PROCESSOR WITH BASIC BLOCK AND MULTI-BLOCK TRACE CACHES.

BACKGROUND

Several processors (such as microprocessors) compatible with CISC architectures (such as the X86 and VAX architectures) provide for one or more constant values to be optionally specified by each instruction, and each constant value optionally occupies a field of one of a variety of widths. Each constant variously represents a memory displacement, an absolute memory address, a segment identifier, an immediate value, or some other similar fixed value. In some processors enabled for fast and efficient execution, CISC instructions having variable-number and variable-sized constant values are translated to relatively simple operations.

In some usage scenarios, constants for immediate and displacement values appear are among the most frequently used addressing modes. For example, a well-known reference book for computer architecture ("Computer Architecture: A Quantitative Approach" by John L. Hennessy and David A. Patterson, 4th edition, Morgan Kaufmann Publishers, 2006/) indicates that immediates and displacements are used in 70% to 80% of memory addressing modes for representative programs. The Hennessy reference also indicates that the majority of immediate and displacement constants are small values that can be represented with just a few bits. Nevertheless, in some usage scenarios, a substantial percentage of immediate and displacement constants require a larger number of bits. For example, in some architectures, a complete word is required to represent an arbitrary memory address.

In some processors enabled for fast and efficient execution, CISC instructions having variable-number and variable-sized constant values are translated to relatively simple operations. In some processors, these translated operations are grouped together into longer instruction words known as "Very Long Instruction Word" (VLIW) formats. VLIW formats optionally provide flexible representation for small and large constant values. For example, the Multiflow VLIW instructions (R. P. Colwell et al, "A VLIW architecture for a trace Scheduling Compiler," IEEE Transactions on Computers, August 1988, pp. 967-979.) support small constant values stored with each operation, as well as large constant values that are optionally associated with any operation of a VLIW instruction word.

All of the foregoing patents and references are hereby incorporated by reference for all purposes.

SUMMARY OF THE INVENTION

The invention, in response to inefficiencies in storing fixed-size embedded constants with operations, provides a microarchitecture for compact storage of embedded constants. In some embodiments a method comprises constructing a constant operand of a first one of a stream of operations having an ordering. The constructing is via referencing one or more bit fields of a stream of bit fields corresponding to the stream of operations. The referencing is according to a window into the stream of operations, with the window including the first operation and one or more additional operations. The additional operations include: operations of the stream of operations that immediately precede the first operation according to the ordering, operations of the stream of operations that immediately follow the first operation according to the ordering, or both operations of the stream of operations that immediately precede the first operation according to the ordering, and operations of the stream of operations that immediately follow the first operation according to the ordering. The method further comprises repeating the constructing with a second operation of the stream of operations. The constructing and the repeating occur as part of processing by a processor implemented within an integrated circuit.

In some embodiments, a processor comprises a plurality of entries. Each entry is enabled to store one or more operations and one or more bit fields. The operations and the bit fields are of respective streams. The stream of bit fields corresponds to the stream of operations. The stream of operations has an ordering. The processor further comprises a constant constructing circuit enabled to construct a constant operand of a particular one of the operations via referencing one or more of the bit fields in accordance with a window into the stream of operations. The window includes the particular operation and one or more additional operations. The additional operations include: operations of the stream of operations that immediately precede the particular operation according to the ordering, operations of the stream of operations that immediately follow the particular operation according to the ordering, or both operations of the stream of operations that immediately precede the particular operation according to the ordering and operations of the stream of operations that immediately follow the particular operation according to the ordering.

In some embodiments, a processor comprises means for storing a stream of operations, and the stream of operations has an ordering. The processor further comprises means for storing a stream of bit fields corresponding to the stream of operations. The processor further comprises means for constructing a constant operand of a particular operation of the stream of operations via referencing one or more of the bit fields in accordance with a window into the stream of operations. The window is associated with the particular operation.

In some embodiments, a medium readable by a computer system contains descriptions that specify, when processed by the computer system, a circuit. The circuit comprises an entry storing sub-circuit enabled to store one or more operations and one or more bit fields. The operations and the bit fields are of respective streams. The stream of bit fields corresponds to the stream of operations. The stream of operations has an ordering. The circuit further comprises a constant constructing sub-circuit adapted to interface to one or more execution pipelines of a processor and enabled to construct a constant operand of a particular one of the operations via referencing one or more of the bit fields in accordance with a window into the stream of operations. The window includes the particular operation and one or more additional operations. The additional operations include: operations of the stream of operations that immediately precede the particular operation according to the ordering, operations of the stream of operations that immediately follow the particular operation according to the ordering, or both operations of the stream of operations that immediately precede the particular operation according to the ordering and operations of the stream of operations that immediately follow the particular operation according to the ordering.

The invention is optionally embodied in various embodiments, including but not limited to one or more of a process, an article of manufacture, an apparatus, a system, a composition of matter, and a computer readable medium such as a computer readable storage medium or a computer network wherein program instructions, interpretable parameters, and hardware descriptions are sent over optical or electronic communication links.

DETAILED DESCRIPTION OF EMBODIMENTS OF THE INVENTION

Figure 1:
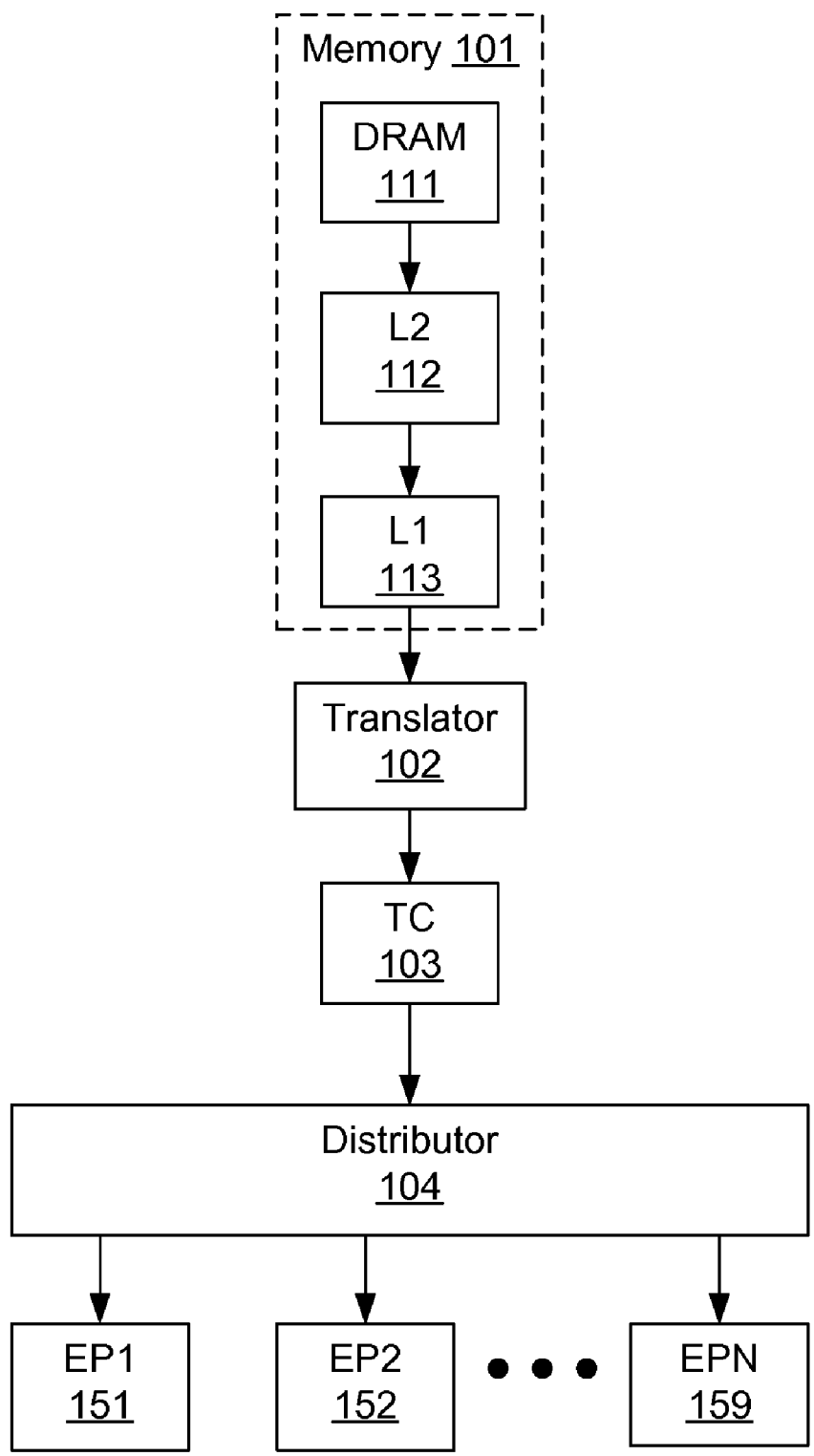
FIG. 1 illustrates selected details of an embodiment of the invention as a system providing compact storage of operations derived from instructions having one or more included constant operand values.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, other, and some) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that, in accordance with a predetermined or a dynamically determined criterion, perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured. As is described in more detail in the Conclusion section, the invention encompasses all possible modifications and variations within the scope of the issued claims.

Introduction

This introduction is included only to facilitate the more rapid understanding of the Detailed Description. The invention is not limited to the concepts described in the introduction, as the paragraphs of any introduction are necessarily an abridged view of the entire subject and are not meant to be an exhaustive or restrictive description. For example, the introduction that follows provides overview information limited by space and organization to only some embodiments. There are in fact many other embodiments, including those to which claims will ultimately be drawn, that are described throughout the balance of the specification.

Acronyms

Elsewhere herein various shorthand abbreviations, or acronyms, are used to refer to certain elements. Descriptions of some of the acronyms follow.

| Acronym | Description |
| --- | --- |
| ALU | Arithmetic Logical Unit |
| CISC | Complex Instruction Set Computer |
| CPU | Central Processing Unit |
| FP | Floating-Point |
| L1 | First-level Cache |
| L2 | Second-level Cache |
| RISC | Reduced Instruction Set Computer |
| SIMD | Single Instruction Multiple Data |

Overview

A processor (such as a microprocessor) having a microarchitecture for compact storage of operations having embedded constants advantageously enables, in various embodiments and usage scenarios, more efficient processing of instructions having variable-number and/or variable-sized constant values, enabling improvements in performance and/or efficiency in some usage scenarios. Rather than allocate sufficient space in each operation to include any combination of full-length constants, various embodiments enable advantageously limiting and/or reducing the constant space required per operation. Although the detailed embodiments described herein are specific to CISC architectures, the embodiments are readily adaptable to RISC architectures having constant values of varying effective widths.

The (optionally fixed-length) operations (also known as "ops") are stored, in various embodiments, in a trace cache organized as a plurality of entries. Each entry has a group of the operations and an associated constant space storage area to store constants for the operations. The group is fixed in size, adapted to store up to a predetermined maximum number of the operations, and the constant space storage area is also fixed in size, but is adapted to store a variable number of variable-length constants.

An original instruction stream having variable length instructions with embedded constants (such as immediate or displacement values, or an absolute address or a segment identifier) is translated into operations in accordance with compact storage of constants. The compact storage of constants is provided by compressing each embedded constant, and then packing the result of the compressing into constant space. The compressing determines a minimum number of bits (or alternatively bytes) required to represent embedded constants. The packing allocates the compressed embedded constants into the constant space, as nearly contiguously as possible, and determines references to the allocated portions of the constant space. The references are, in some embodiments, used as pointers in the operations. The operations and compact constant representations are stored in entries in a trace cache and distributed, according to program order, to execution pipelines for execution. The compact constants are unpacked and uncompressed before (or during) execution of the operations.

An embedded constant is compacted by one or more of a variety of techniques, comprising compressing (e.g. representing as a small constant field), packing (e.g. representing as a pointer), or both. Resultant small constant fields and pointers are included in an operation. The pointer optionally references a small constant field in another operation, or a stored (and optionally compressed) constant in a constant storage section (or pool) associated with a group that includes the operation. An operation optionally includes a plurality of small constant fields and pointers to specify a respective plurality of constants. A plurality of constants are allocated to (and stored in) the constant space storage pool according to requirements of the associated group of operations.

The trace cache entries are all of a fixed size and each have a section for storing a group of operations and an associated section for storing one or more variable-length constants (a constant space storage pool) for use by the operations of the group section. All of the group sections are of a first size, and all of the constant space storage pools are of a second size. The first and second sizes are independent and optionally vary separately according to various embodiments.

The operations are expanded only slightly, in some embodiments, to accommodate the small constant field and the pointer, and the small constant field is chosen to enable many frequently used embedded constants from a CISC original instruction stream (such as +/−1 and +/−2) to be represented entirely within an operation. Rather than directly expanding the operations to incorporate relatively larger constant values, the pointer references a larger constant field associated with and shared by a group of the operations. Storing extra constant bits outside of the operations enables each operation to retain full functionality even when a large constant is required (that is opcode fields of the fixed-width operations, for example, are not narrowed to make room to store the relatively larger constant). In some embodiments and/or usage scenarios, operations requiring constants larger than what a single one of the shared spaces is enabled to store are split into two (or more) operations that merge two (or more) partial values.

In various usage scenarios, constants in the original instruction stream represent displacements or absolute values (relating to address computations, for example), immediate values (relating to arithmetic or logical computations, for example), segment identifiers (relating to address or segment computations), or any combination thereof. The original constants are compressed according to any combination of signed and unsigned representations, according to various embodiments. The original constants are optionally preferentially compressed according to an unsigned representation, in some embodiments, if the unsigned representation is at least as efficient as a signed representation. In some embodiments, original constants of value zero are compressed away entirely, such as by specifying an address computation without a displacement or by specifying an arithmetic/logical computation without an immediate.

System

FIG. 1 illustrates selected details of an embodiment of the invention as a system providing compact storage of operations derived from instructions having one or more included constant operand values. Memory sub-system 101 (having DRAM 111, Level-2 Cache 112, and Level-1 Cache 113) is coupled to Translator 102. The translator is coupled to Trace Cache 103 that is in turn coupled to Distributor 104. The distributor is coupled to one or more execution resources, illustrated as Execution Pipelines 1, 2, and N (EP1 151, EP2 152, and EPN 159, respectively). EP1, EP2, and EPN, according to various embodiments, optionally uniformly or variously support zero or more of superscalar execution, speculative execution, in-order execution, or out-of-order execution.

In operation, instructions are obtained from the memory by instruction fetch and analysis logic of the translator operating with the trace cache. The instructions are parsed and analyzed for translation into operations that are stored in the trace cache. The parsing and analysis comprises determining, for each instruction, how many constants are specified, and for each constant, how many bits are minimally required to represent the respective constant (i.e. the "length" of the constant). The variable numbers of constants of varying length are then translated into one or more compressed representations, packed into shared constant spaces as compact constants, and stored in the trace cache with the corresponding operations.

The stored operations and associated compact constants are, in some embodiments, read from the trace cache and coupled by the distributor to the execution pipelines. The distributor unpacks and uncompresses the compact constants to full size before communication to the execution pipelines. Alternatively the distributor communicates compressed (but unpacked) constants to the execution pipelines for later uncompressing. Alternatively the distributor communicates compact constants to the execution pipelines for later unpacking and uncompressing. The execution pipelines execute the operations in conjunction with the unpacked and uncompressed (e.g. full-size) constants, optionally uniformly or variously via zero or more of superscalar execution, speculative execution, in-order execution, or out-of-order execution.

In various embodiments, all or portions of any combination of the elements of FIG. 1 are comprised in a processor (such as a microprocessor). For example, Level-2 Cache 112, Level-1 Cache 113, Translator 102, Trace Cache 103, Distributor 104, EP1 151, EP2 152, and EPN 159, in some embodiments, are comprised in a microprocessor. In some embodiments, Level-2 Cache 112 is omitted from the microprocessor. Similar embodiments are contemplated.

Compact Constant Storage

Figure 2:
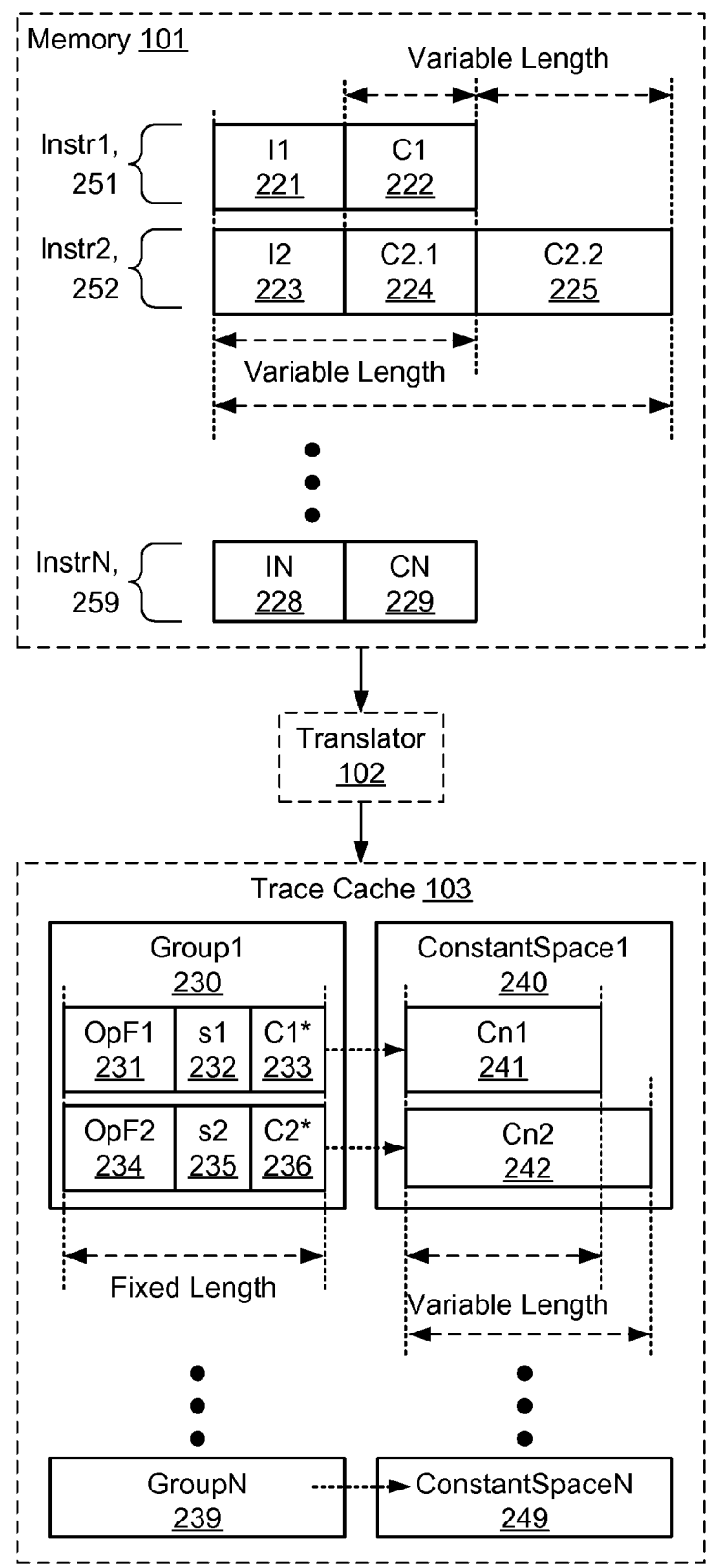
FIG. 2 illustrates selected conceptual aspects of an embodiment of the invention with respect to translation of variable length instructions to fixed-length operations, including provisions for compact storage of embedded constant operand values obtained from the instructions.

FIG. 2 illustrates selected conceptual aspects of an embodiment of the invention with respect to translation of variable length instructions to operations, including provisions for compact storage of embedded constant operand values obtained from the instructions, according to the system context of FIG. 1. Memory sub-system 101 is coupled to Translator 102 that is in turn coupled to Trace Cache 103. Variable-length Instructions 1, 2, and N (251, 252, and 259, respectively) are stored in the memory (in any combination of DRAM as well as L2 and L1 caches).

Each instruction has zero, one, two, or more associated constant values (each of variable length) embedded in the respective instruction (such as address displacements, address absolute values, arithmetic/logical immediate values, or segment identifiers). Each instruction further has other fields, such as an opcode and zero or more source and/or destination specifications. In the figure, Instruction 1 251 has (constant field) C1 222 and (other fields of instruction) I1 221. Similarly, Instruction 2 252 has two constants C2.1 224 and C2.2 225 along with other fields I2 223, and Instruction N 259 has a single constant CN 229 and other fields IN 228.

Instructions are translated into sequences of one or more operations by the translator, and the sequences are stored in entries in the trace cache. Each entry comprises a group of operations and a fixed-size constant space storage area. A first entry in the trace cache has Operation Group 1 230 and Constant Space 1 240. Zero or more other entries are indicated by ellipses. A final entry in the trace cache has Operation Group N 239 and Constant Space N 249. Each of the two operations illustrated in Operation Group 1 230 have small constant fields (s1 232 and s2 235, respectively), pointer-to-constant fields (C1* 233 and C2* 236, respectively), and other fields of the operations (OpF1 231 and OpF2 234, respectively). There are two constants illustrated in Constant Space 1 240, Cn1 241 and Cn2 242, each of a unique length and each allocated within the fixed-size constant storage space.

The small constants, according to various embodiments, are formatted according to any combination of signed and unsigned representations, and are a relatively short length (such as one, two, four, or eight bits). The constants stored in the constant space are stored according to any combination of signed and unsigned representations. The stored constants are optionally variable length (such as one, two, three, four, six, and eight bytes), are optionally stored according to a specific granularity (such as byte granularity), and are optionally stored contiguously (enabling inference of an end of a constant by a beginning of another constant). The pointer-to-constant fields are a relatively short length (such as one, two, three, or four bits) and are optionally interpreted according to a specific granularity (such as one-, two-, or four-byte granularity for constants that are allocated on byte boundaries within the constant space). In some embodiments, the granularity is according to other similar measures of absolute length or position. In other embodiments, the granularity is according to operations, each having constant bits corresponding to the respective operation. As illustrated, C1* 233 points to Cn1 241 and C2* 236 points to Cn2 242.

In some usage scenarios, an instruction has no embedded constants, and a translation of the instruction to one or more operations requires no constants, leaving the small constant and pointer-to-constant fields of the operations translated from the instruction unused. In the usage scenarios having no embedded constants, the translation consumes no space in the constant space area associated with the group the operations are part of.

In some usage scenarios, an instruction has a single embedded constant, and the constant is small enough to represent entirely by a small constant field of a single operation. Larger constant values are optionally represented by combining information in a small constant field of an operation with additional constant data stored in a constant storage space pointed to by a pointer-to-constant field of the operation (the constant storage space is associated with the group the operation is stored in). Larger constant values are also optionally represented entirely by constant data stored in a constant storage space (pointed to by a pointer-to-constant field) leaving unused a small constant field (or enabling the small constant field to be used for another constant). Other techniques for representing relatively large constant values (e.g. packing and compressing) are described elsewhere herein.

In some usage scenarios, an instruction has two (or more) embedded constants, and each embedded constant is optionally represented in accordance with the herein mentioned usage scenario of an instruction with a single embedded constant. Although illustrated as having only a single small constant field and a single pointer-to-constant field, operations optionally have zero or more small constant fields, zero or more point-to-constant fields, or zero or more of both, according to various embodiments. Thus in some usage scenarios, efficient translation of instructions having multiple embedded constants is enabled. In some embodiments, either or both of the small constant and pointer-to-constant fields are omitted from all or any portion of the operations.

Distribution of Operations

Operations are distributed from the trace cache to execution pipelines according to various embodiments. In a first embodiment, compact constant data is unpacked and uncompressed before the operations are replicated and sent to execution pipelines. Scheduling functions in the first embodiment operate with full-size constants. In a second embodiment, compact constant data remains compacted (e.g. remains packed and remains compressed) until after operations are delivered to the execution pipelines. Scheduling functions in the second embodiment operate with compact constant data (or alternatively operate with optionally unpacked or optionally uncompressed constants). In a third embodiment, constant data is unpacked before the operations are delivered to the execution pipelines, but the constant data remains compressed. Scheduling functions in the third embodiment optionally operate with compressed (but unpacked) constants.

Figure 3A:
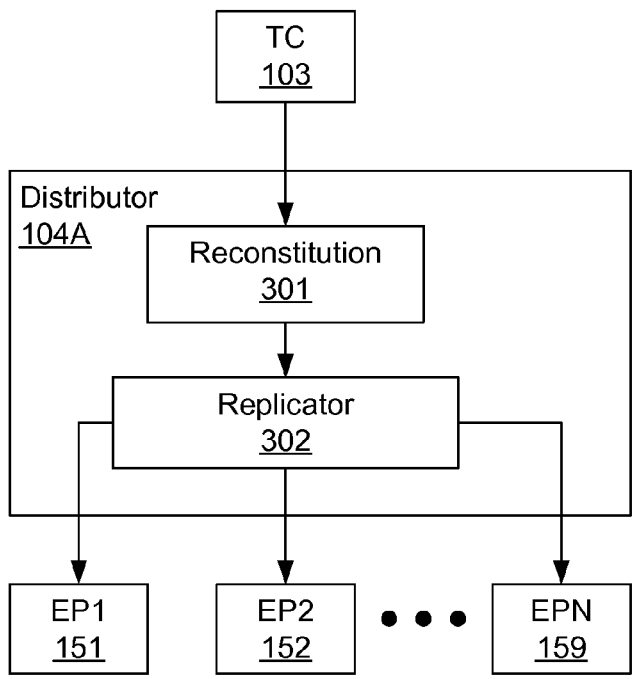
FIGS. 3A-3B illustrate selected details of embodiments of the invention relating to distribution of fixed-length operations and associated (compact) constants to a plurality of execution pipelines.

FIG. 3A illustrates selected details of the first embodiment of distribution of operations and associated constants to a plurality of execution pipelines, according to the system context of FIG. 1. Trace Cache 103 is coupled to Distributor 104A (an embodiment of Distributor 104 of FIG. 1) that is in turn coupled to Execution Pipelines 1, 2, and N (151, 152, and 159, respectively). The distributor comprises Reconstitution unit 301 receiving operations and compact constant information of a predetermined size from the trace cache, and feeding operations with unpacked and uncompressed constant information (i.e. "reconstituted" operations) to Replicator 302. The replicator duplicates the reconstituted operations to each of the execution pipelines. In alternate embodiments, the replicator provides substantially similar reconstituted operations to each of the execution pipelines. In some embodiments, the reconstituted operations are selectively provided to execution pipelines (such as an integer pipeline receiving only integer operations, an FP pipeline receiving only FP operations, or a SIMD pipeline receiving only SIMD operations).

In some embodiments, a single group has more than one operation for more than one execution pipeline, such as a group having an integer operation and an FP operation respectively for an integer pipeline and an FP pipeline. The replicator duplicates only relevant operations of the single group according to the required execution pipelines. In other embodiments, groups are constructed such that each group comprises operations for only a single execution pipeline (such as a group having only SIMD operations). The replicator provides the proper groups to the proper execution pipelines, instead of duplicating operations (or groups).

Figure 3B:
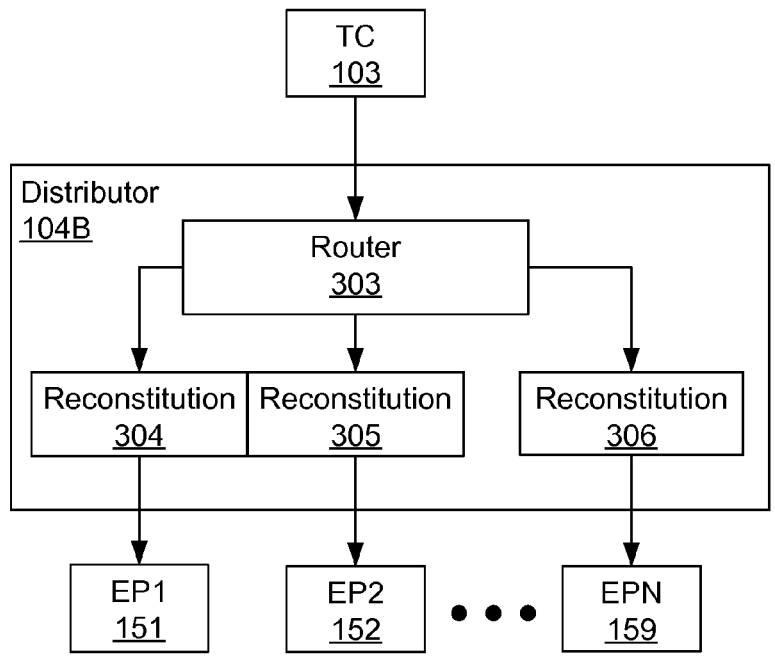

FIG. 3B illustrates the second embodiment of distribution of operations and associated constants to a plurality of execution pipelines, according to the system context of FIG. 1. Trace Cache 103 is coupled to Distributor 104B (an embodiment of Distributor 104 of FIG. 1) that is in turn coupled to Execution Pipelines 1, 2, and N (151, 152, and 159, respectively). The distributor comprises Router 303 that receives operations and compact constant information (of a predetermined size) from the trace cache and selectively feeds the same to Reconstitution units 304, 305, and 306 according to required execution pipeline processing.

For example, integer operations are routed to an integer execution pipeline via a reconstitution unit feeding the integer pipeline. FP operations are routed to an FP execution pipeline via a reconstitution unit feeding the FP pipeline. The reconstitution units unpacks and uncompresses constants from the compact constant information before feeding the execution pipelines. In some embodiments, the reconstitution is performed before storing the operation and constant information in a scheduling structure. In other embodiments, the reconstitution is performed after reading the operation and constant information from the scheduling structure (i.e. constant information is stored in a compact form in the scheduling structure).

As in the embodiment illustrated by FIG. 3A, the embodiment illustrated by FIG. 3B is used, in some embodiments, with groups constructed from heterogeneous operations destined for distinct execution pipelines. Alternatively, in other embodiments, groups are constructed from homogeneous operations destined for a single execution pipeline. Heterogeneous groups are distributed by the router on an individual operation granularity basis. Homogenous groups are distributed by the router as an entire group.

Other embodiments combine techniques of FIG. 3A and FIG. 3B. For example, a first pair of execution pipelines receives operations and fully unpacks and uncompresses constant information as illustrated by FIG. 3A. First and second members of a second pair of execution pipelines selectively receive operations and compact constant information as illustrated by FIG. 3B.

Execution Pipeline Examples

Figure 4:
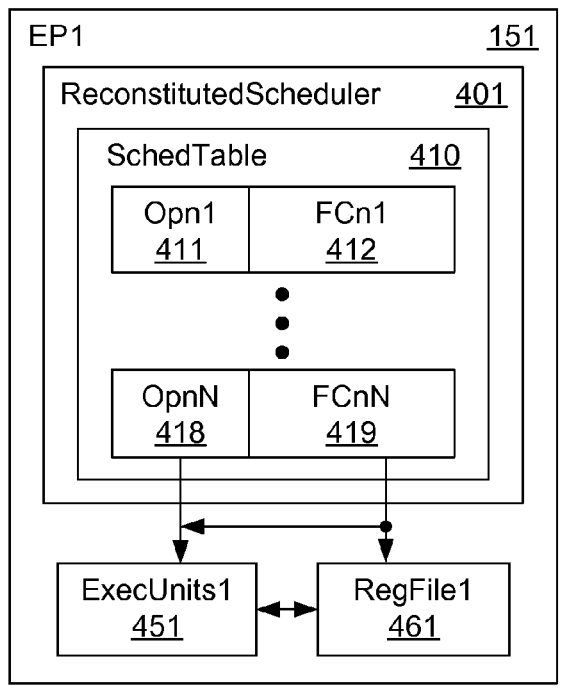
FIG. 4 illustrates selected details of embodiments of the invention with execution pipelines having schedulers storing constant information developed from compact constant data.
Figure 4:
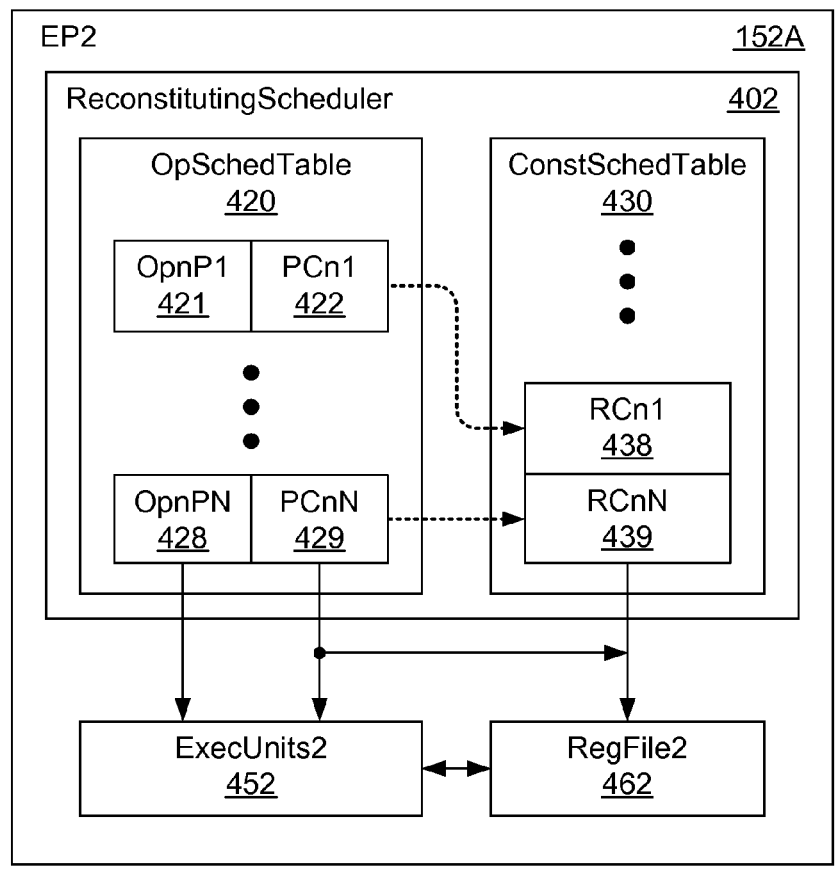

FIG. 4 illustrates selected details of embodiments of the invention with execution pipelines having schedulers storing constant information developed from compact constant data. Execution Pipeline 151 is illustrated as storing fully unpacked and uncompressed constants (according to FIG. 3A, for example). The pipeline comprises Reconstituted Scheduler 401 coupled to Execution Units group 1 451 and to Register File 1 461, with the execution units and the register file in communication. The reconstituted scheduler comprises Scheduler Table 410 illustrated as having a plurality of entries, with each entry having an operation (Operation 1 411 and Operation N 418, for example) and a fully-unpacked and uncompressed constant (Full Constant 1 412 and Full Constant N 419, respectively, for example).

Entries are read from the scheduler and supplied to the execution units and to the register file for execution. As illustrated, the constants are provided to either or both of the execution units and the register file. In some embodiments, a register file port is dedicated to receiving a constant, while in other embodiments a constant is provided to the register file via a shared port (such as a port also used to store execution results).

Although illustrated with a single fully-unpacked and fully-uncompressed constant for each operation, various embodiments provide for two or more fully-unpacked and fully-uncompressed constants for each operation.

Execution Pipeline 152A is illustrated as storing compact constants according to an embodiment of FIG. 3B, where the reconstitution and execution pipeline functions are combined to enable storage of compact constants in the scheduler. The pipeline comprises Reconstituting Scheduler 402 coupled to Execution Units group 2 452 and to Register File 2 462, with the execution units and register file in communication. The reconstituting scheduler comprises Operation Scheduler Table 420 and Constant Scheduler Table 430. Operation scheduler table entries comprise an operation field (e.g. Operation P1 421 or Operation PN 428) and a partial constant field (e.g. Partial Constant 1 422 or Partial Constant N 429). Constant scheduler table entries comprise a remainder constant field (e.g. Remainder Constant 1 438 or Remainder Constant N 439).

Operations having no constants requiring space in the constant scheduler table are only allocated an entry in the operation scheduler table, while operations having a compressed constant are allocated an entry in each table. For example, if an operation requires a constant that is small enough to be represented in the partial constant field, then no constant scheduler table space is required. For another example, if an operation requires a constant that is too large to be represented in the partial constant field, then an entry in the constant scheduler table is allocated in addition to an entry in the operation scheduler table.

In some embodiments, information in the partial constant field is combined with information in the corresponding entry in the constant scheduler table to develop a large constant. For example, Partial Constant 1 422 is concatenated with Remainder Constant 1 438. Additionally or alternatively, Partial Constant N 429 is concatenated with Remainder Constant N 439. In some embodiments, the partial constant field is used as a pointer to a corresponding entry in the constant scheduler table (such as Partial Constant 1 422 pointing to Remainder Constant 1 438 and Partial Constant N 429 pointing to Remainder Constant N 439). In other embodiments, a combination of combining and pointing is used. In yet other embodiments enabling combining of the partial constant field and the constant scheduler table entry information, a side table (not illustrated) provides a pointer to the corresponding entry in the constant scheduler table. Using the side table enables reading out operation information from the operation scheduler table and, in parallel, reading out constant information from the constant scheduler table.

In some embodiments, one or more register file write ports are dedicated to storing (fully unpacked and fully uncompressed) constants from the scheduler. In other embodiments, one or more register file write ports are shared between storing constants from the scheduler and other register file write operations (such as storage of a computed result). In some of the embodiments having shared register file write ports, processing in one or more execution pipelines (such as issuing operations from the scheduler into the pipeline) is conditionally stalled until sufficient register file write port resources become available for entering constants. Other similar embodiments are contemplated.

Compaction and Storage of Large Constants

According to various embodiments, various techniques are used to compact (e.g. pack and/or compress) and store relatively large constant values. FIGS. 5A-5D illustrate selected details of various embodiments of the invention in a context of a trace cache having entries that comprise a group portion (for storage of operation opcode, source and destination specifications, and other similar information) and a constant space portion (for storage of compact constant data derived from embedded constants in original instructions). In some embodiments, each trace cache entry in its entirety is a fixed-size, and the group and constant portions of each entry are also of fixed (but independent) sizes. The group portion is organized to store up to a predetermined maximum number of operations (such as one, two, three, or four operations). The constant space portion is organized to store a variable number of variable-length constants in one or more compressed formats (such as a total space of eight bytes that is selectively allocated as two one-byte constants and a six-byte constant, as a single eight-byte constant, or as two four-byte constants, and so forth). In some embodiments, the constant space portion is organized as a plurality of same-sized elements (such as bit fields), and each element corresponds to one of the operations of the group portion.

Figure 5A:
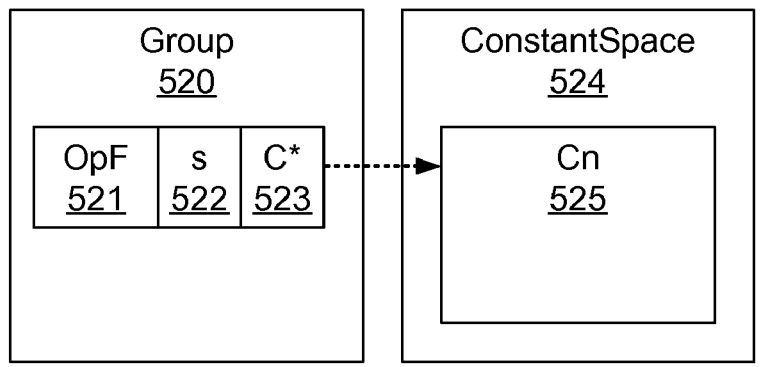
FIGS. 5A-5D illustrate selected details of various embodiments of the invention with storage of information in a context of a trace cache according to a variety of techniques for compact storage of constants having a width greater than a predetermined maximum value.

FIG. 5A illustrates storage of information in a trace cache enabling a first technique of compact storage of constants having a width greater than a predetermined maximum value. The first technique is conceptually considered as a single large constant consuming an entire constant space. A single trace cache entry comprises Operation Group 520 that has a small constant field "s" 522, a pointer-to-constant field C* 523, and other fields of the operation OpF 521 (the group also optionally comprises other operations, not illustrated). An associated single Constant Space 524 in the single trace cache entry is used to store a single constant Cn 525, referred to by pointer-to-constant field C* 523. The single constant Cn 525 is large enough to require the entire space available in Constant Space 524 (leaving no space to allocate other constants). Thus in some embodiments, no other operations in Operation Group 520 refer to constants in Constant Space 524. In some usage scenarios, Cn 525 alone specifies a large constant, while in other usage scenarios, information from small constant field "s" 522 is combined with information stored as Cn 525 (such as by concatenation, sign-extension, zero-extension, or any combination thereof) to specify a large constant.

Figure 5B:
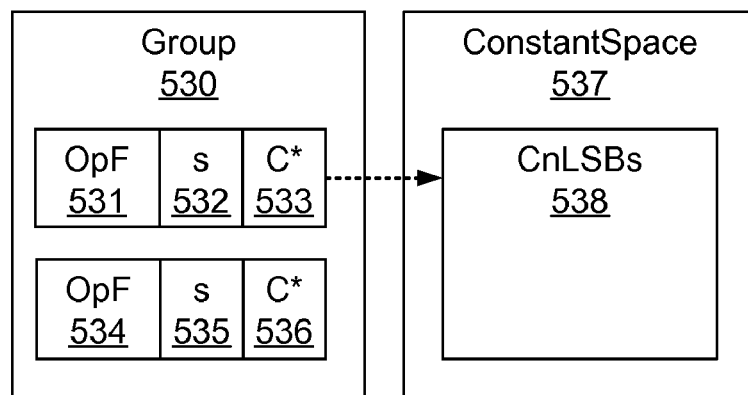
Figure 5B:
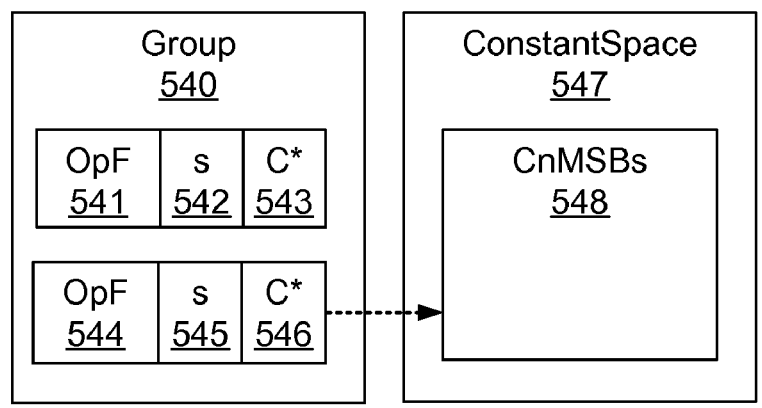

FIG. 5B illustrates storage of information in a trace cache enabling a second technique of compact storage of constants having a width greater than a predetermined maximum value. The second technique is conceptually considered as a single large constant "overflowing" from a first constant space to a second constant space. Information from the two constant spaces is combined (by merging before providing to execution pipelines or by merging in the execution pipelines) to form a larger constant than what a single constant space is capable of representing.

Two trace cache entries comprise respectively Operation Groups 530 and 540 along with Constant Spaces 537 and 547. A first operation in Operation Group 530 comprises other fields of the operation OpF 531, small constant field "s" 532, and pointer-to-constant field C* 533. A second operation in Operation Group 540 comprises other fields of the operation OpF 544, small constant field "s" 545, and pointer-to-constant field C* 546. The first operation pointer-to-constant field C* 533 points to a first portion of a large constant stored in Constant Space 537 and illustrated by Constant LSBs 538. The second operation pointer-to-constant field C* 546 points to a second portion of the large constant stored in Constant Space 547 and illustrated by Constant MSBs 548. Constant LSBs 538 and Constant MSBs 548 are combined (such as by concatenation or merging) either before delivery to execution pipelines or within the execution pipelines (such as by performing one or more register merge operations) to form a single large constant.

In some embodiments that enable the combining within the execution pipelines, a first operation opcode (comprised in OpF 531) specifies an execution pipeline function to store Constant LSBs 538 into a first register, and a second operation opcode (comprised in OpF 544) specifies an execution pipeline function to merge Constant MSBs 548 with contents of the first register, thus performing the combining. In various embodiments information from any combination of small constant fields "s" 532 and 545 is included in the combining to form the single large constant.

Figure 5C:
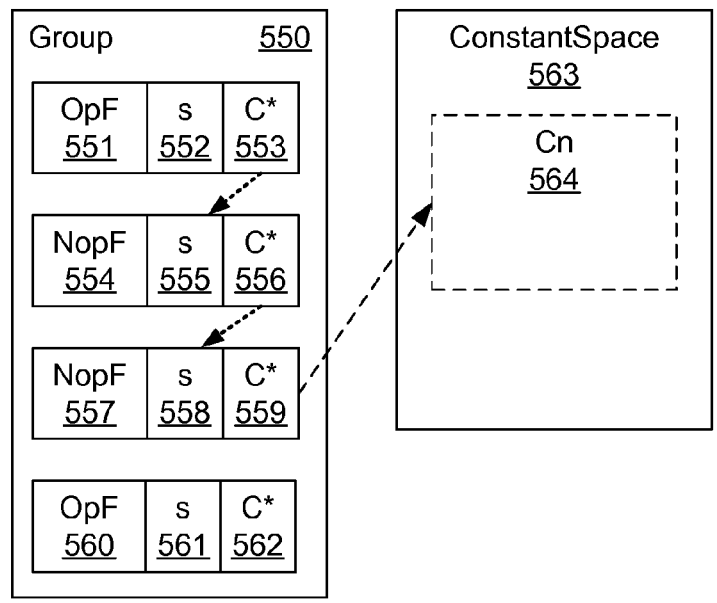

FIG. 5C illustrates storage of information in a trace cache enabling a third technique of compact storage of constants having a width greater than a predetermined maximum value. The third technique is conceptually considered as "chaining" information from a plurality of operations together to form a large constant.

A single trace cache entry comprises Operation Group 550 and associated Constant Space 563. The operation group comprises four operations having small constant fields "s" 552, 555, 558, and 561, respectively. The four operations further comprise pointer-to-constant fields C* 553, 556, 559, and 562, respectively. The four operations further comprise other fields of the operation OpF 551, NopF 554, NopF 557, and OpF 560. As illustrated, the widths of the corresponding fields of the operation are identical. That is, elements 551, 554, 557, and 560 are a same first width, and the small constant fields "s" 552, 555, 558, and 561 are a same second width. The first operation pointer-to-constant field C* 553 points to small constant field "s" 555 of the second operation. Chaining continues with pointer-to-constant field C* 556 of the second operation pointing to small constant field "s" 558 of the third operation. Chaining terminates with pointer-to-constant field C* 559 of the third operation pointing to Constant 564 stored in Constant Space 563. Small constant fields "s" 552, 555, and 558 are combined with Constant 564 to form a single large constant. As described with respect to FIG. 5B, the combining occurs before application to the execution pipelines or within the execution pipelines, according to various embodiments.

Chaining termination is illustrated as ending with constant information in a constant space. In some embodiments (not illustrated), chaining optionally terminates in a small constant "s" instead. For example, chaining terminates with pointer-to-constant field C* 556 pointing to small constant field "s" 558, such that the single large constant is formed solely by combining small constant fields "s" 552, 555, and 558, leaving pointer-to-constant field C* 559 and constant storage space otherwise used by Constant 564 free for specifying another large constant. Similarly, chaining optionally terminates after a single "link", for example with pointer-to-constant field C* 553 pointing to small constant field "s" 555 to specify a large constant formed from small constant fields "s" 552 and 555. Similarly, chaining optionally terminates after any number of links, limited only by resources of a group.

Figure 5D:
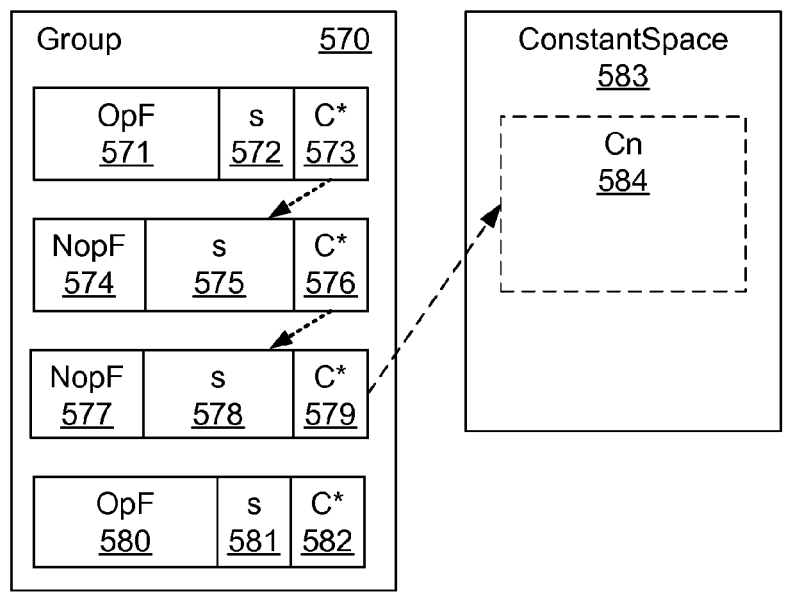

FIG. 5D illustrates storage of information in a trace cache enabling a fourth technique of compact storage of constants having a width greater than a predetermined maximum value. The fourth technique is conceptually similar to the chaining as illustrated by FIG. 5C, but in the fourth technique no-operations (e.g. operations specifying no functional behavior) are formatted to enable relatively larger small constant fields as compared to FIG. 5C. The discussion associated with FIG. 5C applies to elements of FIG. 5D, except that other fields of operations NopFs 574 and 577 (corresponding to no-operations) are narrower than other fields of operations OpFs 571 and 580, enabling small constant fields "s" 575 and 578 (associated with the no-operations) to be wider than small constant fields "s" 572 and 581. In other words, no-operation formatting is tuned so that small constants a no-operation is enabled to represent are larger than small constants that other operations are enabled to represent.

In some embodiments, the predetermined values of the foregoing techniques associated with FIGS. 5A-5D are the same. In various embodiments, one or more of the predetermined values of the foregoing techniques associated with FIGS. 5A-5D are distinct.

Techniques illustrated and described with respect to FIGS. 5A-5D are generally depicted with respect to a single constant per operation. However, in some embodiments, as described elsewhere herein, a plurality of constants are optionally associated with each operation, and the techniques are applicable to compressing the plurality of constants per operation.

Various embodiments enable any combination of the constant compression techniques illustrated in FIGS. 5A-5D to be used in combination. In some embodiments, only a single operation within a group points to the constant space associated with the group (i.e. only one constant is stored in the space). In some embodiments, a plurality of operations point to the constant space associated with the group (i.e. a plurality of constants, each of possibly differing size, are stored in the space).

Although the techniques illustrated in FIGS. 5A-5D are representative of a trace cache context, the same or similar techniques are usable in an operation scheduler context. Total scheduler space is reduced, in some usage scenarios, by storing one or more constants in a compact manner.

Large Constant Compaction/Uncompaction Flow

Conceptually compaction (e.g. compressing and/or packing) of large constants from instructions into a trace cache storing operations comprises several actions, such as the following.

(0) Instructions are analyzed to identify embedded constants, and the constants are compressed, if possible, to a smaller number of bits. Note that while some CISC instructions specify 8-, 16-, 32-bit constants, in some usage scenarios, the constants are small enough to represent in a substantially smaller number of bits (for example a 16-bit field specifying "+1" is represented by only a single bit).

(1) In some embodiments, every operation has a small constant (such as one, two, four, or eight bits). The size of the small constant is chosen to be large enough to support common small values found in CISC instructions. In some embodiments, only a portion of operations have the small constant. In some embodiments, the small constant is optionally omitted from some of the operations. In some embodiments, none of the operations have the small constant.

(2) Operations (are fixed-length and) are arranged in groups limited to a maximum number of operations (such as one, two, three, or four operations). In some operations the maximum number is related to a number of operations conveniently retainable in an integral number of entries of a trace cache.

(3a) If an operation requires more constant bits than are provided by the small constant, then the constant is packed by the operation optionally referring to additional bits of constant space that are shared by the group the operation is part of. In some embodiments, an operation group is limited to holding additional constant bits for a single operation, while in other embodiments a plurality of operations refer to a corresponding plurality of packed constants in the shared space for the group. The shared space is optionally byte-granular in size (such as one, two, three, four, six, or eight bytes). Various packing techniques used, as discussed elsewhere herein.

(3b) Alternatively to action (3a), if an operation requires more constant bits than provided by the small constant, then additional constant bits are provided by the operation conceptually "borrowing" space from another operation in the group. In some embodiments, the other operation "loaning" the space is a no-operation operation (NOP), and encoding of the NOP is chosen to enable storage of an uncompressed in-line constant directly in the NOP. The borrowing operation has a pointer to the loaning operation to reference the in-line constant. If more constant bits are required than are available in the small constant of the borrowing operation together with the in-line constant of the loaning NOP, then the loaning NOP points to another loaning NOP in the group. Borrowing/loaning (or chaining) enables storage of large constants limited only by the number of operations in a group.

(3c) Alternatively to actions (3a) and (3b), if an operation requires more constant bits than provided by the small constant, then additional constant bits are provided by a dedicated operation loading the constant into a register. The dedicated operation is optionally formatted to enable storage of an uncompressed in-line constant (similar to a NOP). The dedicated operation is optionally limited to specifying a destination register and the uncompressed in-line constant, to maximize the size of the uncompressed in-line constant.

(3d) Alternatively to actions (3a) through (3c), if an operation requires more constant bits than provided by the small constant, then additional constant bits are provided by a dedicated operation loading the constant into a register using chaining of constant bits as performed in action (3b).

(4a) If an operation requires a plurality of constants, then each constant is independently compressed according to action (0) and optionally packed according to any of actions (3a) through (3d), limited according to available shared constant space.

(4b) Alternatively to action (4a), if an operation would otherwise require a plurality of constants, then the operation is split into a corresponding plurality of operations, each having a single constant.

(5) If an operation requires more constant storage space than is available in association with the group of operations that would otherwise include the operation, then the operation is moved to another group or alternatively split into a series of operations, each having a respective constant storage space resource.

Conceptually operations and associated compact constant information are fetched from the trace cache and the compact constant information is unpacked and uncompressed for distribution to execution pipelines (or units). Alternatively the constant information is distributed in compact form, reducing routed signal requirements, but requiring an execution unit to receive constant information from groups not otherwise required by the execution unit. For example, when a group of only integer operations borrows constant space from a group of only FP operations, then the FP operation group (in addition to the integer operation group) is sent to an integer execution unit.

In some embodiments, a scheduler resides between the trace cache and the execution units, such as to hold operations until conditions are appropriate for (out-of-order and optionally superscalar) execution. Conceptually compaction of constants within a scheduler comprises several actions, such as any combination of the following.

(6) Each scheduler entry is enabled to retain a small constant if needed by an operation. The scheduler small constants are the same size as a small constant associated with an operation in the trace cache, or alternatively of a different size.

If an operation uses a large constant that is left in a compact form (either unpacked, uncompressed, or both) by logic fetching operations from the trace cache, then logic that fills the scheduler builds the large constant by unpacking and uncompressing the compact representation according to the operation and any appropriate constant storage space information. The resultant large constant is then recorded in any of the following manners.

(7a) If an operation uses a large constant, then the small constant storage associated with each scheduler entry holds a subset of the large constant, and the remaining bits of the large constant are placed in a "constant" scheduler table separate from an "operation" scheduler table holding operation information proper. Since individual operations in a group of operations are placed in individual entries of the operation scheduler table, separate indexes are required for the constant scheduler table and the operation scheduler table. An operation scheduler table entry points to a corresponding constant scheduler table entry (if any). When an operation is issued from the scheduler, the constant scheduler table is read in parallel with reading a register file for operation source operands. In some embodiments, the constant scheduler table has the same as or fewer entries than the operation scheduler table. If the constant scheduler table fills up before the operation scheduler table, then the filling of the scheduler is stalled. If the constant scheduler table has the same number of entries as the operation scheduler table, then the two scheduler tables are optionally indexed identically and no separate constant scheduler table stall is needed.

(7b) Alternatively to (7a), if an operation uses a large constant, then the large constant is written, in its entirety, to the register file when the operation is fetched from the trace cache for insertion in the scheduler. If the operation specifies a destination register, then the large constant is written into the destination register. If the operation does not produce a register result (i.e. a compare or store operation having no destination register), then a destination register is allocated for the operation, even though no result is produced, and the large constant is written into the destination register. A dedicated register write port or alternatively a shared register write port is used to store the large constant. If a shared write port is used, then arbitration logic stalls scheduler filling if the shared port is unavailable for writing the large constant (such as when, for example, the shared port is being used to write a result from operation execution).

In some embodiments, a plurality of constants are compacted into a single large constant. In the case of a store operation having a single large constant that is a compaction of a plurality of constants, special actions are taken, such as one or more of the following.

(8a) In a context relating to action (7a), the plurality of constants are unpacked and uncompressed (e.g. via zero- or sign-extension) after the constant scheduler table is read.

(8b) In a context relating to action (7b), the plurality of constants are unpacked and uncompressed after reading the single large constant from the register file (e.g. the single large constant is stored in the register file). In some embodiments, the unpacking and the uncompressing are wholly or partially overlapped with other operations. For example, a store operation having a constant displacement and immediate store data unpacks a right-aligned compressed representation of the constant displacement from the single large constant after reading from the register file. The right-aligned (compressed) displacement is uncompressed (e.g. sign extended) while also being used to compute lower address bits. Then the lower address bit computation is used with the sign extension results to calculate upper address bits. In parallel with the address calculation, a left-aligned representation of the immediate store data is unpacked (e.g. right-shifted) and uncompressed (e.g. zero- or sign-extended).

In some embodiments, each constant compacted in shared constant space is referred to by a pointer field included in an operation. The pointer indicates the start of the compact constant information in the shared space and is optionally limited to a specific granularity (such as byte granularity). For example, a shared constant space of three bytes has three possible byte-granular starting positions for compact constants.

While the start of a compact constant is specified explicitly by the pointer, the size of the compact constant (or the last bit/byte of the compact constant) is not explicitly specified. Instead the compact constant is assumed to continue in the shared space until it is implicitly terminated by a start of another compact constant as specified by another operation in the group. If the compact constant reaches a maximum constant size or extends to the end of the shared space, then the compact constant is also implicitly terminated.

A constant unpacked from constant bits included in an operation and constant bits from shared space, is, in some usage scenarios, less than a "natural" data size for the operation. The unpacked constant is then uncompressed (e.g. zero- or sign-extended), according to instruction architecture requirements, to the natural data size before use.

If an embodiment provides for relatively large groups (i.e. groups capable of storing a relatively high number of operations), then the embodiment provides relatively large constant storage spaces. A reduction in pointer size is enabled by limiting possible starting positions for packed constants in the shared spaces. For example, each operation is associated with a predetermined offset into the shared space based on a relative position of the operation within a group, thus enabling the operation to specify a small relative offset that is added to the predetermined offset to determine a packed constant start location. As a specific case, if an allowed relative offset is set to a single choice, then the pointer to the constant is implied rather than explicit. Implied pointers are optionally used when borrowing shared constant bits from other operations in a group, such as performed by the aforementioned actions (3b) and (3d).

As an example of some of the aforementioned constant packing techniques, consider a $5^{th}$ operation of a group. The $5^{th}$ operation requires a constant of 0x00003579. The lowest eight bits (0x79) are specified directly by the $5^{th}$ operation, and the remaining bits are stored in an 8-byte shared constant space corresponding to the group. The $5^{th}$ operation is limited, in the example, to referring to packed constant information beginning with the $5^{th}$ byte of the shared constant space, thus requiring a two-bit field to specify a starting byte of a portion of the constant. In the example, the $5^{th}$ byte is already in use, so 0x35 is stored in the 6h byte and 0x00 is stored in the $7^{th}$ byte. Another operation in the group (such as the $6^{th}$ or the $7^{th}$ operation) uses the $8^{th}$ byte, thus indicating that the $7^{th}$ byte is the last byte for the $5^{th}$ operation. When the constant for the $5^{th}$ operation is constructed, the explicit value of 0x79 is combined with additional constant information (0x0035) from the $6^{th}$ and $7^{th}$ bytes of the shared constant space and zero-extended (or sign-extended) to a full constant value of 0x00003579.

As another example, consider operations formatted to include an optional pointer to a shared constant storage space and lacking any explicit constant storage. Constants up to a first size are stored entirely in the shared space and pointed to by the optional pointer. Constants of the first size up to a second size are provided by two operations, the first operation having an explicit representation of the constant and loading the constant into a (scratch register), and the second operation using the scratch register (instead of a constant) as a source. Constants of the second size and greater are provided by four operations. The first operation implicitly refers to the second and third operations, each explicitly specifying half of the constant. The first operation constructs the constant from the information in the second and third operations and loads the constant into a (scratch) register. The fourth operation uses the scratch register (instead of a constant) as a source.

Streams of Operations and Corresponding Streams of Constant Bits

Figure 6:
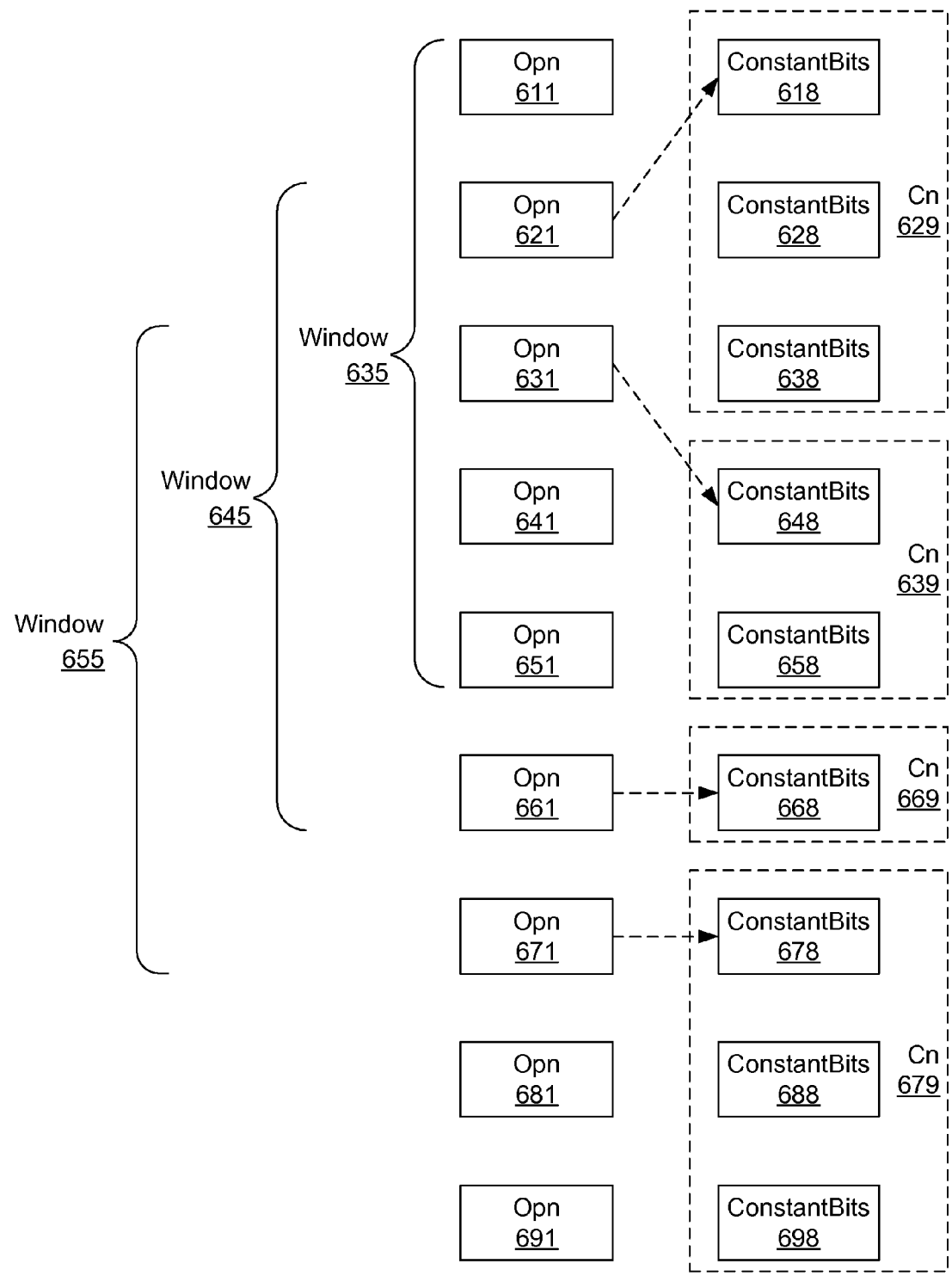
FIG. 6 illustrates selected details of an embodiment of the invention having a stream of operations and a corresponding stream of constant bits.

FIG. 6 illustrates selected details of an embodiment of the invention having a stream of operations (Operations 611, 621, 631, 641, 651, 661, 671, 681, and 691) and a corresponding stream of constant bits (Constant Bits 618, 628, 638, 648, 658, 668, 678, 688, and 698). Constant Bits 618 corresponds to Operation 611, Constant Bits 628 corresponds to Operation 621, and so forth with one-to-one correspondence, with Constant Bits 698 corresponding to Operation 691. The stream of operations has an ordering, illustrated from top to bottom, i.e. Operation 611 is first according to the ordering, immediately followed by Operation 621, and so forth. Operation 691 is last according to the ordering. For example, Operation 611 immediately precedes Operation 621 according to the ordering, while Operation 631 immediately follows Operation 621 according to the ordering. For another example, Operations 641, 631, and 621 immediately precede Operation 651 according to the ordering, while Operations 661, 671, and 681 immediately follow Operation 651 according to the ordering.

In some embodiments, the ordering is in accordance with a program order of instructions (such as a program order of Instructions 1 221, 2 223, and N 228 of FIG. 2). In various embodiments the ordering is in accordance with a logical or a physical ordering of operations as stored in a trace cache. For example, a left-most operation of an entry of the trace cache is first according to the ordering and a right-most operation of the entry is last according to the ordering. For another example, a left-most operation of a first entry in a group of entries of a trace cache is first according to the ordering, and a right-most operation of a last entry in the group of entries is last according to the ordering.

In some embodiments, one or more trace cache entries are each enabled to retain one or more operations (such as any of Operations 611, 621 . . . and 691) along with the corresponding constant bits (Constant Bits 618, 628 . . . and 698). In some embodiments, the operations and corresponding constant bits retained in the trace cache entries correspond respectively to a group of operations and a fixed-size constant space storage area (such as Operation Group 1 230 and Constant Space 1 240 of FIG. 2).

In some embodiments, each of the constant bit elements (such as each of Constant Bits 618, 628 . . . and 698) is a respective bit field that corresponds to a respective (fixed-length) operation retained in an entry of a trace cache. For example, Operation 611 and Constant Bits 618 are stored as a first (fixed-length) operation and a corresponding first bit field in a first entry of a trace cache. Continuing with the example, Operation 621 and Constant Bits 628 are stored as a second (fixed-length) operation and a corresponding second bit field in a second entry of the trace cache. Further continuing with the example, Operation 631 and Constant Bits 638 are stored as a third (fixed-length) operation and a corresponding third bit field in a third entry of the trace cache. In various embodiments and/or usage scenarios, various combinations of the first, the second, and the third entries are the same entry or are distinct entries. For example, the first and the second entries are the same entry (i.e. Operation 611 and Constant Bits 618, as well as Operation 621 and Constant Bits 628, are stored in the same entry) while the third entry is distinct from the (same) first and second entry. For another example, the first, the second, and the third entries are the same entry.

In some embodiments, the bit fields are byte-granular in size, and are referred to as respective "overhead bytes" corresponding to each of the operations. In various embodiments, operations and overhead bytes are organized in pairs, triples, or quads. For example, a pair (or triple or quad) of operations are contiguous with each other in a trace cache entry, and the corresponding pair (or triple or quad) of overhead bytes (e.g. one overhead byte per operation) are contiguous with each other. In some embodiments, the operations and the overhead bytes are contiguous in trace cache entries, while in some embodiments the operations and the overhead bytes are not contiguous in trace cache entries.

In some embodiments, the Operation (such as any of Operations 611, 621 . . . and 691) has one or more register specifications, each enabled to specify one of a plurality of registers, optionally a small constant, or optionally a pointer to a constant. Conceptually the register specifications are similar to a combination of a capability to identify one of the registers along with optionally the aforementioned small constant fields and optionally the aforementioned pointer-to-constant fields. For example, the register specifications are similar to a register identification capability combined with s1 232 (or s2 235) and C1* 233 (or C2* 236) of FIG. 2. For another example, the register specifications are similar to a register identification capability combined with small constant field 522 (or, respectively, small constant fields 532, 535, 542, 545, 552, 555, 558, 561, 572, 575, 578, and 581) and pointer-to-constant field 523 (or, respectively, pointer-to-constant fields 533, 536, 543, 546, 553, 556, 559, 562, 573, 576, 579, and 582) of FIGS. 5A-5D.

Various embodiments in accordance with FIG. 6 provide for compact storage of constants using techniques described, for example, with respect to FIG. 2 and FIGS. 5A-5D. The Operations have a pointer-to-constant field enabled to identify an operation (relative to the ordering), and thus the Constant Bits (or the bit field) that corresponds to the identified operation. The pointer-to-constant field is of a limited width, and thus is enabled to point to a limited range, or window of operations.

As illustrated, Window 635, associated with Operation 631, comprises Operations 611, 621, 631, 641, and 651, and represents two operations immediately preceding and two operations immediately following Operation 631. Window 635 also comprises the Constant Bit elements respectively corresponding to the Operations of the Window (Constant Bits 618, 628, 638, 648, and 658). Similarly, Window 645, associated with Operation 641, comprises the same Operations (and Constant Bits) as Window 635, except Operation 661 (and Constant Bits 668) are present while Operation 611 (and Constant Bits 618) are not. Further similarly, Window 655, associated with Operation 651, comprises the same Operations (and Constant Bits) as Window 645, except Operation 671 (and Constant Bits 678) are present while Operation 621 (and Constant Bits 628) are not. Thus the windows overlap with each other and conceptually "slide" by one operation with respect to the immediately preceding (or immediately following) operation according to the ordering.

Each operation, in accordance with the respective associated window, has accessibility to constant bit elements within the respective associated window (but lacks accessibility to constant bit elements not within the respective associated window). For example, Window 635, associated with Operation 631, represents an ability of Operation 631 to access Constant Bit elements 618, 628, 638, 648, and 658. In some embodiments windows are truncated by boundaries of operation groups, i.e. constant bit elements that would otherwise be accessible are not accessible if not in the same group as an accessing operation.

As illustrated in FIG. 6, Operation 621 points to Constant Bits 618, enabling identification of constant Cn 629, derived from Constant Bit elements 618, 628, and 638. The pointer-to-constant field of Operation 621 has the value minus one, to identify one operation immediately preceding according to the ordering (i.e. Operation 611), and the bit field corresponding to the identified operation is Constant Bits 618. Similarly, Operation 631 points to Constant Bits 648, enabling identification of constant Cn 639, derived from Constant Bit elements 648 and 658. The pointer-to-constant field of Operation 631 has the value plus one, to identify one operation immediately following according to the ordering (i.e. Operation 641), and the bit field corresponding to the identified operation is Constant Bits 648. Operations 641 and 651 identify no constants derived from the Constant Bits. Operation 661 identifies constant Cn 669, derived from Constant Bits 668, via a pointer-to-constant field having a value of zero (i.e. pointing to itself). Operation 671 identifies constant Cn 679, derived from Constant Bit elements 678, 688, and 698, via a pointer-to-constant field having a value of zero (i.e. pointing to itself). Operations 681 and 691 identify no constants derived from the Constant Bits.

Note that the end of constant Cn 629 is indicated by the start of constant Cn 639. Similarly, the start of constant Cn 669 indicates the end of constant Cn 639, and the start of constant Cn 679 indicates the end of constant Cn 669. Thus, in some embodiments, no specific length (or end marker) is provided with respect to the constants in constant bit elements, and instead an end of a constant is indicated by a beginning of a next constant. In some embodiments, an end of a constant is further determined by a pre-determined maximum constant length (such as two, four, six, eight, or 16 bytes). In some embodiments, an end of a constant is further determined by an end of a group of operations (such as an end of a trace cache entry or an end of a last entry in a group of trace cache entries).

Thus a plurality of variable length constants are derived from fixed-length bit fields (the Constant Spaces) each corresponding to respective operations.

Example Hardware Embodiment Techniques

In some embodiments, various combinations of all or portions of functions performed by a translator (such as Translator 102 of FIG. 1), a distributor (such as Distributor 104 of FIG. 1), execution resources (such as EP1 151, EP2 152, and EPN 159 of FIG. 1) and portions of a processor or a microprocessor providing all or portions of the aforementioned functions, are specified by descriptions compatible with processing by a computer system (e.g. Verilog, VHDL, or any similar hardware description language). In various embodiments the processing comprises any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques comprise a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

Example Embodiments

In some embodiments, an operation storage unit of a processor comprises entry information receiving and entry writing logic coupled to a plurality of entries, and further comprises entry accessing and entry reading logic coupled to the entries. Each entry comprises a respective operation storage portion and a respective constant storage portion. Each operation storage portion is usable to store a plurality of fixed-width operations. Each constant storage portion is a fixed-size and is accessible via the respective operation storage portion as a variable number of variable-length constants.

In some embodiments, one of the fixed-width operations has a field adaptable to selectively designate a one of the variable-length constants of the respective constant storage portion as a constant referenced by an operation specified by the one of the fixed-width operations. In some embodiments, the one of the fixed-width operations has another field usable to selectively designate another one of the variable-length constants of the respective constant storage portion as another constant referenced by the specified operation.

In some embodiments, a first one and a second one of the fixed-width operations have respective fields usable to selectively designate respective first and second ones of the variable-length constants of the respective constant storage portion as respective first and second constants referenced respectively by first and second operations specified by the first and second ones of the fixed-width operations.

In some embodiments, one of the fixed-width operations has a respective small-constant field to optionally specify a small constant. In some embodiments, the respective small-constant field is a first respective small-constant field, the small constant is a first small constant, and the at least one of the fixed-width operations has a second respective small-constant field to optionally specify a second small constant.

In some embodiments, an operation storage unit of a processor comprises operation entry information receiving and writing logic coupled to a plurality of operation entries each being a first fixed size, and further comprises constant entry information receiving and writing logic coupled to a plurality of constant entries each being of a second fixed size. The operation storage unit further comprises operation entry accessing and reading logic coupled to the operation entries, and constant entry accessing and reading logic coupled to the constant entries. Each constant entry is usable to store a plurality of variable-length constants. Each operation entry is usable to store a plurality of fixed-width operations at least one of which is enabled to reference a selected one of the constant entries.

In some embodiments, the reference to the selected one of the constant entries identifies a single constant value. In some embodiments, the single constant value is at least one of a complete constant and a partial constant portion formatted for combining with a remainder constant portion. In some embodiments, the remainder constant portion is comprised in the at least one fixed-width operation.

In some embodiments, the reference to the selected one of the constant entries identifies a plurality of constant values.

In some embodiments, the operation entries are greater in number than the constant entries. In some embodiments, the reference to the selected one of the constant entries is explicit.

In some embodiments, the operation entries are equal in number to the constant entries. In some embodiments, the reference to the selected one of the constant entries is implicit. In some embodiments, In some embodiments, the operation storage unit is comprised in a scheduler unit of the processor. In some embodiments, the scheduler unit is compatible with operation in a microprocessor comprised in the processor. In some embodiments, the operation storage unit is comprised in a trace cache of the processor. In some embodiments, the trace cache is compatible with operation in a microprocessor comprised in the processor.

In some embodiments, a system comprises an instruction decoder to decode instructions and a trace cache coupled to the instruction decoder. The trace cache is enabled to provide compressed storage of constants determined in response to decoded instruction information from the instruction decoder. In some embodiments, the instruction decoder comprises an instruction translator enabled to translate instructions from a relatively complex instruction set architecture to operations implementing a relatively simple instruction set architecture. In some embodiments, the system further comprises an execution unit coupled to the trace cache. In some embodiments, the system further comprises an operation delivery unit coupling the execution unit to the trace cache. In some embodiments, the execution unit comprises a plurality of operation execution pipelines.

In various embodiments, the operation delivery unit is enabled to provide operations from the trace cache to the operation execution pipelines via any combination of duplicating operations to two or more of the operation execution pipelines and directing a first and a second subset of operations to respective first and second ones of the operation execution pipelines. In some embodiments, operation delivery unit is further enabled to provide operations to the operation execution pipelines that have constants fully-uncompressed to a predetermined fixed width. In some embodiments, operation delivery unit is further enabled to provide operations to the operation execution pipelines that have constants formatted according to the compressed storage provided by the trace cache. In some embodiments, the operation execution pipelines comprise respective scheduling units. In some embodiments, the scheduling units are enabled to store constants according to the compressed storage provided by the trace cache.

In some embodiments, the system further comprises a memory sub-system coupled to the instruction decoder. In some embodiments, the system further comprises a fetch unit that couples the instruction decoder to the memory sub-system. In various embodiments, the memory sub-system comprises any combination of a DRAM storage array, an L2 cache, and an L1 cache.

In some embodiments, a system comprises a plurality of operation execution units and a trace cache coupled to the operation execution units. In some embodiments, the trace cache is enabled to store constants in a reduced-space manner, with the constants being determined from an instruction stream.

In some embodiments, the operation storage unit is enabled to provide at least a portion of the constants to the operation execution units in a fixed-width format. In some embodiments, the operation storage unit is enabled to provide at least a portion of the constants to the operation execution units in a fully-uncompressed format. In some embodiments, the operation storage unit is enabled to provide at least a portion of the constants to the operation execution units in the reduced-space manner.

In some embodiments, the trace cache is organized as a collection of entries, each entry having a respective group portion and a respective constant space portion, and each group portion is capable of storing a plurality of fixed-width operations. In some embodiments, each respective group portion is enabled to identify constants in the respective constant space portion. In some embodiments, each constant space portion is a predetermined size. In some embodiments, a constant that is too large to represent according to the predetermined size is specified by a combination of a first one and a second one of the group portions. In some embodiments, the first one of the group portions identifies a first portion of the constant that is too large as a portion of the respective constant space portion of the entry having the first group portion. In some embodiments, the second of the group portions identifies a second portion of the constant that is too large as a portion of the respective constant space portion of the entry having the second group portion.

In some embodiments, the reduced-space manner is in accordance with one or more small-constant fields associated with an operation. In some embodiments, the reduced-space manner is in accordance with one or more pointers to a portion of a pool of constant space storage. In some embodiments, the reduced-space manner is in accordance with a pointer to a small-constant field, the pointer being in an operation and the small-constant field being in another operation. In some embodiments, the reduced-space manner is in accordance with a chain of pointers from one operation to another, the pointers referencing small-constants included in operations.

In some embodiments, the system further comprises an operation providing unit coupling the trace cache to the operation execution units. In some embodiments, the operation providing unit is enabled to copy operations to at least two of the operation execution units. In some embodiments, the operation providing unit is enabled to selectively provide a first and a second subset of operations to respective first and second ones of the operation execution units. In some embodiments, the operation execution units are enabled to execute out-of-order. In some embodiments, the operation execution units are enabled to execute speculatively. In some embodiments, the operation execution units are pipelined.

In some embodiments, the system further comprises an instruction translator enabled to determine the constants from the instruction stream. In some embodiments, the instruction translator is enabled to access a memory sub-system. In some embodiments, the memory sub-system comprises any combination of a DRAM storage array, an L2 cache, and an L1 cache. In some embodiments, the system further comprises the memory sub-system.

In some embodiments, a system comprises an execution unit and an operation scheduler coupled to the execution unit. The operation scheduler is compatible with compressed storage of constants. In some embodiments, the system further comprises an operation storage unit coupled to the operation scheduler. In some embodiments, the operation storage unit is comprised in a trace cache. In some embodiments, the system further comprises a memory sub-system coupled to the trace cache. In some embodiments, the system further comprises an instruction decoder coupling the memory sub-system to the trace cache. In some embodiments, the memory sub-system comprises any combination of a DRAM storage array, an L2 cache, and an L1 cache.

In some embodiments, the compressed storage of constants is in accordance with allocating one or more small-constant fields in an operation entry of the operation scheduler. In some embodiments, the compressed storage of constants is in accordance with allocating one or more pointer fields in an operation entry of the operation scheduler. In some embodiments, the constant are stored in constant-operand entries of the operation scheduler. In some embodiments, the operation entry is one of a plurality of operation entries. In some embodiments, the operation entries are at least equal in number to the constant-operand entries. In some embodiments, the operation entries are greater than in number to the constant-operand entries.

In some embodiments, the compressed storage of constants is in accordance with allocating a plurality of pointer fields in an operation entry of the operation scheduler to point to a plurality of constants used by an operation stored in the operation entry.

In some embodiments, the operation storage unit is compatible with compressed storage of constants. In some embodiments, the compressed storage of constants is via a plurality of techniques.

In some embodiments, the operation scheduler is enabled to duplicate operations to at least two operation execution pipelines of the execution unit. In some embodiments, the operation scheduler is enabled to direct a first and a second subset of operations to respective first and second ones of at least two operation execution pipelines of the execution unit.

In some embodiments, the processor comprises a microprocessor. In some embodiments, the operation storage unit is comprised in the microprocessor. In some embodiments, the microprocessor is enabled to operate in a superscalar manner. In some embodiments, the microprocessor is further enabled to operate in an out-of-order fashion. In some embodiments, the microprocessor is further enabled to operate speculatively. In some embodiments, the operation of the microprocessor comprises performing functions specified by some of the operations or some of the fixed-width operations.

In some embodiments, a method comprises analyzing an instruction to determine constants imbedded in the instruction and representing, for each of the constants, the respective constant as one of a small constant included in a fixed-width operation and a pointer to a constant storage pool. The constant storage pool is a fixed-size. The fixed-width operation and the constant storage pool are compatible with storage in a trace cache. The analyzing and the representing are via hardware units of a processor. In some embodiments, the processor comprises a microprocessor. In some embodiments, the microprocessor comprises the hardware units.

In some embodiments, the method further comprises analyzing an additional instruction to determine additional constants embedded in the additional instruction. In some embodiments, the method further comprises representing at least one of the additional constants as another pointer to the constant storage pool. In some embodiments, a length of a constant in the constant storage pool is described by at least one of an explicit length and an implied length. In some embodiments, a length of a constant in the storage pool is determined by at least one of reaching the end of the constant storage pool and reaching the beginning of another constant in the constant storage pool. In some embodiments, the pointers are at least one of byte granular, two-byte granular, four-byte granular, and six-byte granular.

In some embodiments, one or more of the instructions are of a CISC architecture, and in some embodiments one or more of the instructions are of a RISC architecture. In some embodiments, the fixed-width operation is associated with a RISC architecture. In some embodiments, the fixed-width operation is determined by translating the instruction as a CISC instruction to a RISC instruction.

In some embodiments, the method further comprises storing the fixed-width operation in the trace cache. In some embodiments, the method further comprises storing a representation of at least one of the constants in the constant storage pool. In some embodiments, the method further comprises supplying the fixed-width operation to an execution unit. In some embodiments, the method further comprises supplying at least one of the constants to an execution unit. In some embodiments, the method further comprises providing the fixed-width operation and at least one of the constants to an execution unit.

In some embodiments, a method comprises determining if a constant used by an operation is smaller than a predetermined width; if the constant is smaller than the predetermined width, then storing the operation and the constant in an operation table at a first index; and if the constant is not smaller than the predetermined width, then storing the operation in the operation table at the first index and storing the constant in a constant table at a second index. The determining and the storing are via hardware units of a processor. In some embodiments, the method further comprises providing the operation and the constant to an execution unit. In some embodiments, the method further comprises executing the operation according to the constant via the execution unit. In some embodiments, the determining comprises translating a CISC instruction to a sequence of operations including at least the operation. In some embodiments, at least one of the tables is implemented within a trace cache. In some embodiments, at least one of the tables is implemented within an operation scheduler.

In some embodiments, a method comprises determining if a constant used by an operation is smaller than a predetermined width; if the constant is smaller than the predetermined width, then allocating space for the operation and the constant in an operation table; and if the constant is not smaller than the predetermined width, then allocating space for the operation in the operation table and allocating space for the constant in a constant table. The determining and the allocating are via hardware units of a processor. In some embodiments, the method further comprises providing the operation and the constant to an execution unit. In some embodiments, the method further comprises executing the operation according to the constant via the execution unit. In some embodiments, the method further comprises translating a CISC instruction to a sequence of operations including at least the operation. In some embodiments, at least one of the tables is implemented within a trace cache. In some embodiments, at least one of the tables is implemented within an operation scheduler.

CONCLUSION

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to embody various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; details of the instructions, and the operations; number of and details of operations and constant storage spaces associated with the trace cache; the size and organization of the trace cache; the size and organization of the scheduler, the techniques for compressed storage of constants; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

Certain choices have been made in the description merely for convenience in preparing the text and drawings and unless there is an indication to the contrary the choices should not be construed per se as conveying additional information regarding structure or operation of the embodiments illustrated. Illustrative examples of the choices of convenience include: the particular organization or assignment of the designations used for the figure numbering and the particular organization or assignment of the element identifiers (i.e., the callouts or numerical designators) used to identify and reference the features and elements of the embodiments.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

The invention claimed is:

1. A method comprising:
constructing a constant operand of a first one of a stream of operations having an ordering, the constructing via referencing one or more bit fields of a stream of bit fields corresponding to the stream of operations, the referencing according to a window into the stream of operations, the window including the first operation and one or more additional operations, wherein the additional operations include:
operations of the stream of operations that immediately precede the first operation according to the ordering,
operations of the stream of operations that immediately follow the first operation according to the ordering, or
both operations of the stream of operations that immediately precede the first operation according to the ordering, and operations of the stream of operations that immediately follow the first operation according to the ordering; and repeating the constructing with a second operation of the stream of operations; and wherein the constructing and the repeating occur as part of processing by a processor implemented within an integrated circuit.

2. The method of claim 1, wherein the operations are a same fixed-length.

3. The method of claim 1, wherein the bit fields are a same fixed-length.

4. The method of claim 1, wherein the constructing is further via determining an ending one of the referenced bit fields based on the constructing with the second operation.

5. The method of claim 1, wherein the constructing is further via uncompressing the referenced bit fields.

6. The method of claim 1, wherein the constant operand is a first constant operand, and further comprising constructing a second constant operand of the first operation.

7. The method of claim 1, further comprising performing an arithmetic/logical function specified by the first operation using the constant operand as an immediate.

8. The method of claim 1, further comprising performing an address calculation specified by the first operation using the constant operand as a displacement.

9. The method of claim 1, further comprising performing an address calculation specified by the first operation using the constant operand as an absolute address.

10. The method of claim 1, further comprising performing a segment calculation specified by the first operation using the constant operand as a segment identifier.

11. A processor comprising:
a plurality of entries, each enabled to store one or more operations and one or more bit fields, the operations and the bit fields being of respective streams, the stream of bit fields corresponding to the stream of operations and the stream of operations having an ordering;
a constant constructing circuit enabled to construct a constant operand of a particular one of the operations via referencing one or more of the bit fields in accordance with a window into the stream of operations, the window including the particular operation and one or more additional operations; and
wherein the additional operations include:
operations of the stream of operations that immediately precede the particular operation according to the ordering,
operations of the stream of operations that immediately follow the particular operation according to the ordering, or
both operations of the stream of operations that immediately precede the particular operation according to the ordering and operations of the stream of operations that immediately follow the particular operation according to the ordering.

12. The processor of claim 11, wherein the operations are a same fixed-length.

13. The processor of claim 11, wherein the bit fields are a same fixed-length.

14. The processor of claim 11, further comprising a trace cache comprising the entries.

15. The processor of claim 14, wherein the trace cache is enabled to store at least a portion of the additional operations contiguously with the particular operation.

16. The processor of claim 14, wherein the trace cache is enabled to store at least a portion of the referenced bit fields contiguously.

17. The processor of claim 11, further comprising a scheduler comprising the entries.

18. The processor of claim 11, further comprising one or more execution pipelines enabled to process the constant operand as an immediate of an arithmetic/logical function specified by the particular operation.

19. The processor of claim 11, further comprising one or more execution pipelines enabled to process the constant operand as a displacement of an address calculation specified by the particular operation.

20. The processor of claim 11, further comprising one or more execution pipelines enabled to process the constant operand as an absolute address of an address calculation specified by the particular operation.

21. The processor of claim 11, further comprising one or more execution pipelines enabled to process the constant operand as a segment identifier of a segment calculation specified by the particular operation.

22. A processor comprising:
means for storing a stream of operations, the stream of operations having an ordering;
means for storing a stream of bit fields corresponding to the stream of operations; and
means for constructing a constant operand of a particular operation of the stream of operations via referencing one or more of the bit fields in accordance with a window into the stream of operations, the window being associated with the particular operation.

23. The processor of claim 22, further comprising means for compacting constants embedded in instructions to form the stream of bit fields.

24. A medium readable by a computer system that contains descriptions that specify, when processed by the computer system, a circuit comprising:
an entry storing sub-circuit enabled to store one or more operations and one or more bit fields, the operations and the bit fields being of respective streams, the stream of bit fields corresponding to the stream of operations and the stream of operations having an ordering;
a constant constructing sub-circuit adapted to interface to one or more execution pipelines of a processor and enabled to construct a constant operand of a particular one of the operations via referencing one or more of the bit fields in accordance with a window into the stream of operations, the window including the particular operation and one or more additional operations; and
wherein the additional operations include:
operations of the stream of operations that immediately precede the particular operation according to the ordering,
operations of the stream of operations that immediately follow the particular operation according to the ordering, or
both operations of the stream of operations that immediately precede the particular operation according to the ordering and operations of the stream of operations that immediately follow the particular operation according to the ordering.

25. The medium of claim 24, wherein the constant constructing sub-circuit is further enabled to determine an ending one of the referenced bit fields based on constructing another constant operand.

26. The medium of claim 24, wherein the circuit further comprises an execution pipeline sub-circuit enabled to execute the particular operation in accordance with a result of the constant constructing sub-circuit.

27. The medium of claim 24, wherein the circuit further comprises an execution pipeline sub-circuit enabled to execute the particular operation using a result of the constant constructing sub-circuit selectively as an immediate of an arithmetic/logical function or as a displacement of an address calculation.

* * * * *